Feb. 21, 1933. S. A. HAINES 1,898,832
FLUID DELIVERY MEANS FOR COOKING AND BREWING UTENSILS
Filed April 14, 1930
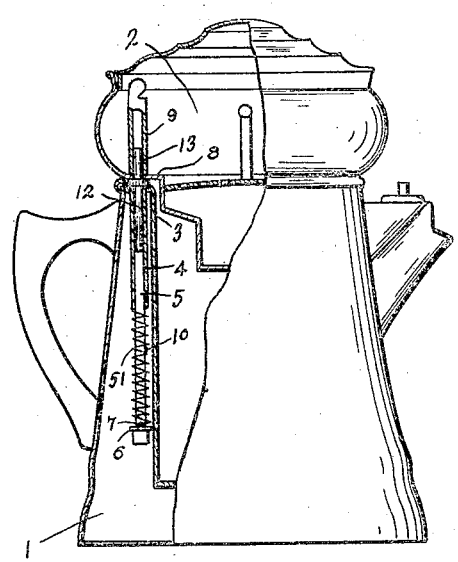
Fig.1
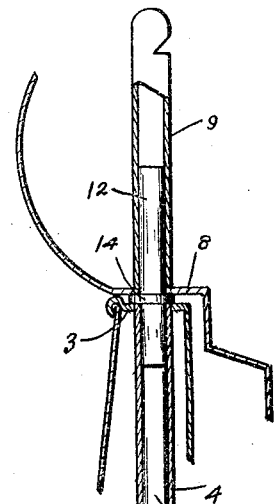
Fig.2
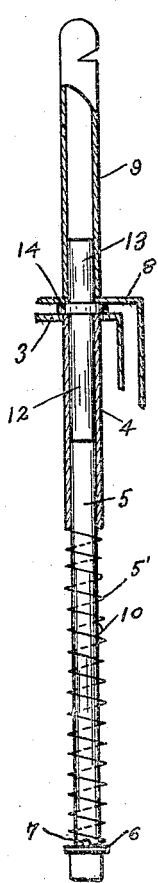
Fig.3
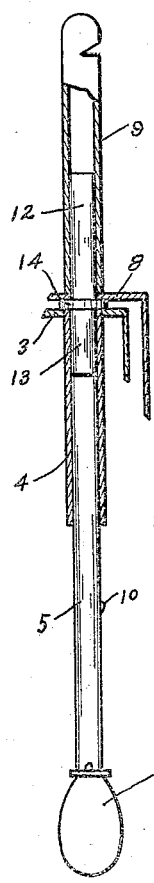
Fig.4
Fig.7
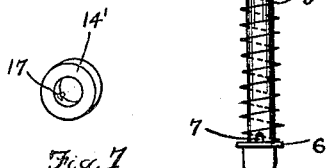
Fig.6
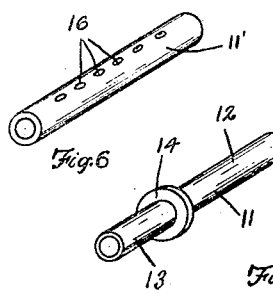
Fig.5
INVENTOR.
Stacey A. Haines
BY
Ray Oberlin & Ray
ATTORNEYS.

Patented Feb. 21, 1933

1,898,832

UNITED STATES PATENT OFFICE

STACEY A. HAINES, OF KANSAS CITY, MISSOURI, ASSIGNOR OF ONE-HALF TO HAROLD F. SPENCER, OF KANSAS CITY, MISSOURI

FLUID DELIVERY MEANS FOR COOKING AND BREWING UTENSILS

Application filed April 14, 1930. Serial No. 444,156.

My invention, relating as indicated to a fluid delivery means for cooking and brewing utensils, has specific reference to the construction of means associated with a utensil having a plurality of chambers, such means being adapted to transfer variable portions of the contents of one of such chambers to the other, the amount transferred being dependent upon the adjustment of such transferring means.

Specifically my invention contemplates the provision of a fluid delivery tube which may be extended for variable distances into the fluid in the chamber from which such fluid is to be transferred, the distance which such conduit extends in the fluid determining the quantity of fluid to be transferred. While the following description is given in connection with the application of the principles of my invention to a beverage brewing device, it should be noted that my invention is equally applicable to utensils of other types, the beverage brewing device being illustrated here only as one form of utensil to which my invention may be applied.

The specific form of fluid delivery structure to which the principles of my invention are most applicable consists of a fluid delivery tube which depends into the body of fluid, a portion of which is to be transferred to another chamber, the adjustment of the depth of the fluid to which such tube extends determining the quantity thereof which will be drawn off. The principles of my invention reside in the provision of a simple means for adjusting the depth to which such fluid delivery tube extends into the fluid and, further, to the maintaining of such tube in the adjusted position during the use of the utensil. It is among the objects of my invention to provide a fluid delivery means for utensils having the above-named characteristics. Other objects of my invention will appear as the description proceeds.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of the various mechanical forms in which the principle of the invention may be used.

In said annexed drawing:—

Fig. 1 is a broken elevational view of a beverage brewing device showing associated therewith the device comprising the principles of my invention; Figs. 2 and 3 are fragmentary part sectional part elevational views of the device comprising my invention as illustrated in Fig. 1 drawn to an enlarged scale; Fig. 4 is a part sectional part elevational view of an alternative form of construction; Fig. 5 is a perspective view of the spacer element employed in my device; and Figs. 6 and 7 are perspective views of the elements comprising an alternative form of spacer element.

Referring more specifically to the drawing and more especially to Fig. 1 and like figures in which like ordinals are employed to designate like parts, the utensil here shown for purposes of illustration is a beverage brewing device comprising a boiling chamber 1 and an infusion chamber 2. The structure comprising my invention is designed for the purpose of transmitting a predetermined quantity of fluid from the boiling chamber 1 to the infusion chamber 2, although it will be noted in the course of the following description that the fluid delivery means comprising my invention is applicable to multi-chambered utensils other than the brewing device illustrated in this figure.

Referring to Figs. 2 and 3, the ordinal 3 is employed to indicate a partition member which may separate the chambers of the utensil and which is utilized in this particular illustration to support the fluid delivery means.

The wall 3 has preferably rigidly secured thereto a tubular member 4 which depends for a short distance into the lower chamber. Telescopically engaged by this depending tubular member 4 is a tubular member 5 which has a circumferential flange 6 formed adjacent its lower end and an aperture 7 formed in the wall thereof immediately above such flange. The lower terminal portion of the tubular member 4 and the member 5 are interconnected by a retractile spring 5' which normally tends to urge the member 5 upwardly with respect to the tubular member 4.

The wall 8 of the second chamber, that is, the chamber to which the fluid is to be transferred, has preferably rigidly secured thereto a fluid delivery conduit 9 preferably tubular in form and having an inside diameter equal to the inside diameter of the tubular member 4. When the second chamber is positioned over the first chamber the members 4 and 9 will be arranged coaxially so that the tube 5, or a like tube, may pass upwardly through the tube 4 and enter the lower end of the tube 9.

With the chambers properly positioned, one with respect to the other, spring 5' will move the tube 5 upwardly into the tube 9 until a projection 10 strikes the lower end of the member 4, which projection determines the elevation of the fluid delivery tube 5 and therefore determines the quantity of liquid which is to be drawn off from the lower chamber.

For the construction just described the spring 5' will always move the tube 5 to the same position and consequently a like amount of fluid will be drawn off from the lower chamber for each operation of the utensil, provided the boiling chamber is filled to the same level previous to each operation. In order to provide for vertical adjustment of the tube 5 I have provided a tubular member 11 which is divided into relatively long and short extensions 12 and 13 by a circumferential flange 14. By inserting the relatively long portion 12 of the tubular element 11 in the tubular member 4 until the flange 14 rests on the upper end of the member 4, such extension 12 will engage the upper end of the tube 5 as the same is urged upwardly under the influence of the spring 5'. With the spacer element 11 in the position indicated in Fig. 3 the relatively short section 13 will extend upwardly and be engaged by the tubular member 9 and the flange 14 will lie intermediately of the partition members 3 and 8 so that a rigid assembly of the various elements is insured during the use of the utensil. The length of the portion 12 of the spacer element 11 determines the depth in the fluid of the aperture 7 and consequently when the boiling chamber is filled to the same level previous to each cooking or brewing operation a like quantity of fluid will be drawn from such boiling chamber for each operation of the brewing or cooking device.

By inverting the position of the spacer element 11 from that illustrated in Fig. 3 to that illustrated in Fig. 2, that is, by having the relatively short section 13 extending into the tubular member 4 and the relatively long section 12 extending into the tubular member 9, the spring 5' will move the member 5 upwardly into the tubular member 4 to another operating position. This operating position, when the spacer element 11 is constructed in accordance with the form illustrated in Fig. 6, will permit the tube 5 to draw off a quantity of liquid from the boiling chamber which is more than that drawn off when the spacer element is omitted entirely from the assembly, and less than that which is drawn off when the spacer element is in the position illustrated in Fig. 3.

The above description has been made in contemplation of the employment of a spacer element 11, such as is illustrated in Fig. 5 and in which the circumferential flange 14 is preferably formed integrally with the tubular body of the element. However, I may prefer to have the spacer element 11 formed with the flange separately therefrom and adjustable longitudinally with respect thereto, which form of construction of the spacer element is most clearly shown in Figs. 6 and 7. In this form of construction the body 11' has a plurality of longitudinally spaced indentions 16 which will coact with an inwardly directed projection 17 formed integrally with the flange or collar 14' and maintain such collar in any one of a plurality of positions longitudinally of the body 11' so that a wider range of adjustments is possible than when the flange 14 is rigidly secured to the spacer element.

It should be noted in connection with the construction of this alternative form of spacer element that frictional resistance alone between the member 14' and the tube 11' may be relied upon to maintain the collar or flange 14 in proper adjusted position. The magnitude of the projection 17 and the indention 16 will be such that the telescopic engagement of collar 14' by the tube 11' will not be interfered with, but nevertheless being sufficient to maintain the parts in rather rigid assembled relation.

Instead of employing a spring as 5' to insure the upward movement of the tubular member 5 against either end of the spacer element 11 or against the stop 10, I may prefer to employ a gas bulb float 15 which, when secured to the lower end of the tubular member 5, will serve the same purpose and in an equally efficient manner as the spring 5'. I prefer to construct the gas bulb float 15 of metal so that the liquid which normally surrounds such float will be positively excluded from the interior thereof and thereby prevented from interfering with the function of such float.

It will be seen in connection with the above description that I have provided a fluid delivery means for cooking utensils which is exceedingly simple in construction and which, by the employment of a minimum number of parts, may be adjusted to effect the transfer of variable quantities of fluid from one of such chambers to another, depending upon the particular arrangement of the parts in assembly. A further description of the principles comprising my invention is deemed unnecessary for those familiar with the art, suffice it to say that minute changes may be made in the particular form of construction here chosen for purposes of illustration, such as the arrangement of the stop 10 within the tube 9 and like deviations from the construction here illustrated, which do not affect the principles comprising my invention. The advantages incidental to the employment of the device comprising my invention are believed to be so apparent upon an examination of the structure that a reiteration thereof at this point is believed unnecessary.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a utensil for the purpose indicated, in combination with two chambers constituting a unitary structure, fluid delivery means for transferring variable quantities of fluid from one of said chambers to the other, said means comprising a duct element having intake in one of said chambers and discharge in the other and comprising a fixed portion and a telescoping extension in the first mentioned chamber affording the intake; resilient means reacting on said extension for telescoping it with the fixed portion, and a stop member co-axially associated with the fixed member for limiting the telescoping of the extension with respect to the fixed member for determining the distance to which the duct element extends into the second mentioned chamber for fluid intake.

2. The construction defined in claim 1, the stop member being arranged for adjustment to a plurality of positions longitudinally of the fixed member to vary the distance and level to which the duct element extends into the second mentioned chamber for fluid intake therefrom.

3. In a utensil for the purpose indicated, a higher chamber and a lower chamber having a partition between them, means for transferring a variable quantity of fluid from the lower to the higher chamber, said means comprising a duct member and a guide for the same mounted in said partition, and a tubular member insertable in said guide means for stopping the upper end of said duct member for determining the position of the intake of the latter in the lower chamber.

4. In a utensil, the combination with a higher and a lower chamber having a partition between them; delivery means for transferring fluid from the lower of said chambers to the upper, a support for said fluid delivery means carried by said partition, said delivery means being arranged for adjustment of the intake end portion in the lower chamber, said support being tubular, and a tubular spacing element insertable in said tubular supporting means for spacing said intake end portion from the discharge portion in the upper chamber, and thereby adjusting the position of the intake in the lower chamber.

5. In a utensil for the purpose indicated, in combination with a higher and a lower chamber constituting a unitary structure, a wall member partitioning the two chambers, fluid delivery means for transferring a variable quantity of fluid from the lower to the upper of said chambers comprising a tubular element consisting of separate tube parts carried by the wall member and extending in the two chambers respectively, a stop member consisting of a tube carried by the wall member with its opposite end portions extending respectively in telescopic relation with the two tube parts in the respective chambers, whereby said stop means serves to position the two tube parts in alignment with the two chambers respectively.

6. In a utensil, the combination with an upper and a lower chamber of duct means extending into the fluid contained in the lower chamber for delivering such fluid to the upper chamber, a guide member supporting said delivery means mounted on a portion of said utensil, the inlet portion of said duct means being movable relatively to the fixedly supported part for varying the position of the intake in the lower chamber, and yielding means urging said inlet portion longitudinally of the guide member for positioning the intake at one limit of the range of movement of said inlet portion.

7. In a utensil, the combination with a plurality of chambers, a partition between said chambers, means extending into the fluid contained in one of such chambers for delivering such fluid to another of such chambers, a guide for said delivery means supported by said partition between said chambers, means associated with said delivery means yieldingly urging such means upwardly out of said fluid and means associated with said support maintaining said delivery means in any one of a plurality of positions.

8. In a utensil, the combination with a plurality of chambers, of means extending into the fluid contained in one of such chambers for delivering such fluid to another of said chambers, a guide for said delivery means mounted on a portion of said utensil, and a float mounted on the fluid entering terminal of said delivery means 9. In a utensil, the combination with a plurality of chambers, of means extending into the fluid contained in one of such chambers for delivering such fluid to another of said chambers, a guide for said delivery means mounted on a portion of said utensil, and a hollow sealed gas bulb mounted on the fluid entering terminal of said delivery means.

10. In a utensil, the combination with a plurality of chambers, of fluid delivery means extending into the fluid in one of such chambers, means associated with such utensil movably supporting said fluid delivery means, means associated with said fluid delivery means normally urging said means upwardly out of such fluid, and means insertable in said supporting means regulating the position of said delivery means.

11. In a utensil, the combination with a plurality of chambers, of a tubular fluid delivery means normally extending into the fluid in one of said chambers, a guide laterally supporting said fluid delivery means secured to a portion of such utensil, and means insertable in said guide axially positioning said fluid delivery means with respect to said guide.

12. In a utensil, the combination with a pluralty of chambers, of a tubular fluid delivery means normally extending into the fluid in one of such chambers for delivering such fluid to the other of said chambers, means associated with said tubular delivery means normally urging such delivery means upwardly out of such fluid, a tubular guide laterally supporting said fluid delivery means secured to a portion of such utensil, and a spacer member having a circumferential flange adjustable along said spacer member for adjusting the position of said delivery tube.

13. In a utensil, the combination with a plurality of chambers, of a tubular fluid delivery means normally extending into the fluid in one of such chambers for delivering such fluid to the other of said chambers, means associated with said tubular delivery means normally urging such delivery means upwardly out of such fluid, a tubular guide laterally supporting said fluid delivery means secured to a portion of such utensil, and a spacer member having a circumferential flange secured thereto at a point longitudinally removed from the center thereof, said spacer member being insertable in said guide for adjusting the position of said delivery tube.

14. In a utensil, the combination with a plurality of chambers, of a tubular fluid delivery means normally extending into the fluid in one of such chambers for delivering such fluid to the other of said chambers, means associated with said tubular delivery means normally urging such delivery means upwardly out of such fluid, a tubular guide laterally supporting said fluid delivery means secured to a portion of such utensil, and a spacer member having a circumferential flange movably secured thereto insertable in said guide for adjusting the position of said delivery tube.

15. In a utensil, the combination with an inner and outer chamber, of a guide associated with the partition between said chambers, a tubular fluid conduit movably supported by said guide means associated with said delivery conduit normally urging the same upwardly and out of such fluid, and means insertable in said guide determining the extent of immersion of said delivery conduit.

16. In a utensil, the combination with an inner and outer chamber, of a guide associated with the partition between said chambers, a tubular fluid conduit movably supported by said guide, resilient means associated with said delivery conduit normally urging the same upwardly and out of such fluid, and means insertable in said guide determining the extent of immersion of said delivery conduit.

17. In a utensil, the combination with a plurality of chambers, of an adjustable fluid delivery means for transferring variable quantities of fluid from one of such chambers to another, resilient means urging said delivery means upwardly in one of said chambers, and means coaxially mounted with said fluid delivery means for determining the extent of said delivery means into said last named chamber.

18. In a utensil, the combination with a plurality of chambers, of means extending into the fluid contained in one of such chambers for delivering such fluid to another of said chambers, a guide movably supporting delivery means mounted on a portion of said utensil, and a spring associated with said delivery means normally urging such means out of said fluid.

Signed by me this 4th day of April, 1930.

STACEY A. HAINES.